United States Patent [19]

Meyer, Jr. et al.

[11] 4,140,733
[45] Feb. 20, 1979

[54] POLYETHYLENE-BASED BOOKBINDING HOT-MELT ADHESIVE

[75] Inventors: Max F. Meyer, Jr.; Richard L. McConnell, both of Kingsport, Tenn.

[73] Assignee: Eastman Kodak Company, Rochester, N.Y.

[21] Appl. No.: 788,472

[22] Filed: Apr. 18, 1977

[51] Int. Cl.$^2$ ............................................. C08L 23/08
[52] U.S. Cl. .............................. 260/897 B; 260/27 R; 260/27 EV; 260/45.7 S; 260/45.85 B; 260/45.95 H
[58] Field of Search ....................... 260/897 B, 27 EV

[56] References Cited

U.S. PATENT DOCUMENTS

| | | | |
|---|---|---|---|
| 3,275,494 | 9/1966 | Brunson et al. | 161/33 |
| 3,318,977 | 5/1967 | Battersby et al. | 260/889 |
| 3,468,978 | 9/1969 | Battersby | 260/897 |
| 3,595,943 | 7/1971 | Brunson et al. | 260/897 |
| 3,615,106 | 10/1971 | Flanagan et al. | 281/21 |
| 3,700,758 | 10/1972 | Johnson et al. | 260/897 |
| 3,926,878 | 12/1975 | Shimizu et al. | 260/27 EV |

*Primary Examiner*—Carman J. Seccuro
*Attorney, Agent, or Firm*—Clyde L. Tootle; Daniel B. Reece III

[57] ABSTRACT

The hot-melt adhesives of the present invention comprise a blend of polyethylene, tackifier resin, and ethylene-alkyl acrylate or alkenyl carboxylate copolymers. These adhesive compositions have low melt viscosities, good flexibility at 20° F., and provide good page pull and page flex values on books bound with these adhesives. Therefore, these adhesive compositions are useful as hot-melt adhesives for use in bookbinding applications.

20 Claims, No Drawings

POLYETHYLENE-BASED BOOKBINDING HOT-MELT ADHESIVE

This invention relates to hot-melt adhesive compositions comprising polyethylene, tackifying resin, and an ethylene/vinyl acetate copolymer or ethylene/alkyl acrylate copolymer. These hot-melt adhesives are particularly useful for binding paperbacked and hardbound books.

Large quantities of adhesives are used in the binding of books, magazines, and other binding applications. Previously, it has been customary to use an aqueous adhesive such as glue or the like to attach the pages together to the binding. This type of binding has found particular use in paper-covered editions and magazines. Such glues are generally of animal origin and are in limited supply. Also, the water in the adhesive must be absorbed or evaporated, requiring a period of time for the glue to set before the books and magazines can be distributed. Also, a considerable amount of energy can be expended in disposing of the water in the glue. Hot-melt adhesives which eliminate the problem of eliminating the water and which have a faster set-up time have been developed. One such hot-melt adhesive is based on ethylene/vinyl acetate (EVA) copolymers. These EVA-based hot-melt adhesives contain 25–45% EVA copolymer, 30–40% tackifier, and 20–30% paraffin or microcrystalline wax. Although these EVA-based adhesives have certain desirable properties, they are brittle at 20° F. and books bound with them break apart when opened at low temperatures. Low-viscosity polyethylene-based adhesives normally used for packaging applications do not provide adequate page pull or page flex values when books are bound with them.

In the binding of paperbacked books, the adhesive is applied from a wheel applicator to the back of signatures which have been collected, trimmed, and notched. Then the paperback is attached before the adhesive has solidified.

In the binding of hardbound books, a poly(vinyl acetate) latex primer is applied to the trimmed and notched signatures before application of the adhesive. The purpose of the primer is to provide improved page pull and page flex values for the bound book. The poly(vinyl acetate) primers are brittle at 20° F. Many hardbound books are put through a rounding process in which the back of the books is given a semiround shape. Therefore, it would be an advance in the state of the art to provide a hot-melt adhesive system which will withstand the rounding process for hardbound books and provide good page pull, page flex, and low temperature flexibility for both paperback and hardbound books.

We have recently found that a multi-component blend comprised of a maleated polyethylene, wherein all or part of the polyethylene component is maleated, an ethylene/vinyl acetate copolymer (or ethylene-alkyl acrylate copolymer), and a tackifying resin provides good page pull and page flex values on either paperbacked or hardbacked books. These compositions have a melt viscosity low enough to be used in a wheel applicator and they are flexible as well as nonbrittle at temperatures substantially below 20° F. It was found that the addition of about 15% of a tackifier such as EASTMAN Resin H-130 and about 10% of an ethylene/vinyl acetate copolymer containing about 15–30% vinyl acetate to selected maleated polyethylenes provide an adhesive having good flexibility at temperatures below 20° F. and melt viscosities below 10,000 cp. Books bound with this blend have good page pull ($\geq 4.0$ pounds/inch) and good page flex ($\geq 300$) values on either primed or unprimed books.

The low density polyethylenes useful in the present invention are well known in the art and can be prepared by the high pressure polymerization of ethylene in the presence of free radical catalysts and have crystalline melting points (Tm) of about 95° to 115° C. These polyethylenes have a melt viscosity at 190° C. of about 100 to about 30,000 cp. and acid numbers of 0 to 60. These polyethylenes have a density of about 0.904 g/cm$^3$ to about 0.940 g/cm$^3$, preferably about 0.904 g/cm$^3$ to about 0.930 g/cm$^3$, and most preferably about 0.906 g/cm$^3$. These polyethylenes can be unmodified polyethylene or polyethylene which has been degraded. Also, these polyethylenes can be degraded polyethylenes which have been oxidized or reacted with maleic anhydride or acrylic acid, for example. These polyethylenes can be used in amounts of about 45 percent to about 85 percent by weight, preferably about 55 percent to about 75 percent by weight.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such hydrocarbon tackifying resin is a hydrocarbon resin having a softening point of 130° C. and available commercially as Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. Examples of such commercially available resins of this type are Wingtack resins sold by the Goodyear Tire and Rubber Company and the Sta-Tac, Nirez and Betaprene H resins sold by the Reichhold Chemical Corporation.

Also other suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials Staybelite Ester 3, triethylene glycol ester of hydrogenated rosin, Foral 85 and 105, highly stabilized ester resins of pentaerythritol and rosin base.

The hydrocarbon resins, polyterpenes, and rosin esters can be used either alone or in combinations; however, in general, the better results have been obtained with the hydrocarbon resins used alone. These tackifying resins, which preferably have softening points of at least 100° C. and most preferably at least 120° C., can be used in amounts of about 10 percent to about 35 percent by weight of the adhesive composition, preferably about 15 percent to about 30 percent by weight.

The ethylene/vinyl acetate copolymers useful in the practice of this invention may contain from about 10 to about 35 weight percent vinyl acetate but the preferred range is from about 18 to about 30 weight percent. The melt index of these ethylene copolymers may range from about 50 (melt viscosity 165,000 cp at 190° C.) to about 250 (melt viscosity 33,000 cp at 190° C.) but is preferably in the range of about 100 (melt viscosity 82,000 cp at 190° C.) to about 200 (melt viscosity 40,000 cp at 190° C.). Ethylene-alkyl acrylate copolymers where the alkyl group may be methyl, ethyl, butyl, and the like may also be used instead of the ethylene-vinyl acetate copolymers. Such ethylene-alkyl acrylate copolymers and their method of preparation are well known in the art.

It was unobvious and unexpected to find that the ethylene-vinyl acetate and ethylene-alkyl acrylate copolymers could be incorporated in the polyethylene-based blends of this invention. For example, when molten blends of polyethylene and ethylene copolymers are allowed to solidify, the polyethylene crystallizes and excludes the ethylene copolymer portion of the blend from the polyethylene spherulites. Thus, blends of polyethylene and ethylene copolymers generally have a cheesy nature rather than being tough and flexible. In order to provide useful blends for the practice of this invention, it is desirable to limit the amount of ethylene copolymer in the blend to less than 20 weight percent.

A useful hot-melt adhesive for the binding of books must meet the following critical requirements:

| | |
|---|---|
| Melt viscosity (ASTM-1238-57T) | $\leq$ 10,000 cp at 190° C. |
| Page pull (Collins Page Pull Test carried out on a Collins Page Pull Tester) | $\geq$ 4.0 lb/in. |
| Page flex (Collins Page Flex Test carried out on a Collins Page Flex Tester) | $\geq$ 300 flexes |
| Flexibility (manual flex test on samples conditioned at low temperatures) | Flexible below 20° F. |
| Adhesion to primer - Adhesive must adhere to poly(vinyl acetate) primers without separation or loss of adhesion when bonded samples are flexed at ambient or at low temperatures | |

Useful blends in the practice of this invention generally have a melt viscosity in the range of about 2000 to about 10,000 cp at 190° C. while preferred blends have melt viscosities of about 2500 to about 6500 cp at 190° C. This melt viscosity limitation can be achieved by the proper selection and concentration of the components of the blend. One polyethylene component of the blend should have a saponification number of at least 2. Blends of two or more polyethylenes such as maleated and nonmaleated polyethylene may be used to provide the desired saponification number and melt viscosity of the polyethylene component.

The adhesive compositions of this invention are prepared by blending together the components in the melt at a temperature of about 180° C. to about 230° C. until a homogeneous blend is obtained, approximately 2 hours. Various methods of blending materials of this type are known to the art and any method that produces a homogeneous blend is satisfactory. These components blend easily in the melt and a heated vessel equipped with a stirrer is all that is required. For example, a Cowles stirrer provides an effective mixing means for preparing these hot melt adhesive compositions.

In addition to the above listed components, it is desirable for the hot melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, Ionox 220 and 330 [tris(di-t-butyl-p-hydroxybenzyl)-trimethylbenzene], Dalpac 4C2 [6-di(t-butyl)-p-cresol], Naugawhite (alkylated bisphenol), Butyl Zimate (zinc dibutyl dithiocarbamate) and Ethyl 702 [4,4'-methylene bis(2,6-di-tert-butylphenol)]. A particularly effective antioxidant is Irganox 1010 which is identified as tetrakis[methylene-3-(3',5'-di-t-butyl-4'-hydroxyphenylpropionate] methane when used in combination with Cyanox 1212 (American Cyanamid) which is laurylstearyl thiodipropionate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

611.6 Grams of low density polyethylene having a melt viscosity at 190° C. of 3075 cp, a saponification number of 4.0 and Tm of 102° C. (Epolene C-16); 373.7 grams of low density polyethylene having a melt index of 220, melt viscosity of 41,000 cp at 190° C. and a Tm of 100° C. (Epolene C-13); 224.2 grams of a hydrocarbon tackifier having a Ring and Ball Softening point of 130° C. (EASTMAN Resin H-130); 149.5 grams of ethylene/vinyl acetate copolymer having a melt index at 190° C. of 169 and a vinyl acetate content of 28% (Elvax 220); and 4.7 grams of Cyanox 1212 and 1.4 grams of Irganox 1010 antioxidants are blended in a 5-liter round-bottom flask at 200° C. under nitrogen with stirring for three hours. This blend has a melt viscosity of 5900 cp at 190° C. in the Tinius Olsen Melt Indexer.

A 24-mil compression molded film of this blend conditioned at 20° F. for 8 hours does not break or crack when manually flexed. This composition is used to bind books in a Sulby Minabinda at a melt temperature of 350° F. Books bound on this binder give page pull values of 5.3 pounds/inch on a Collins Page Pull Tester at a crosshead speed of 4 inches/minute and page flex values of greater than 300 at 60 cpm with a 2-pound load in a Collins Page Flex Tester. These books did not break in the binding when the books were opened on a flat surface at a temperature of 20° F.

This example shows that a combination of the polyethylene, tackifier, and ethylene/vinyl acetate copolymer within the scope of this invention provides the low melt viscosity needed for use on a wheel applicator while maintaining good adhesive properties and good page pull and page flex values and good low-temperature properties.

EXAMPLE 2

The procedure of Example 1 is followed to prepare a blend comprised of 44.55% low density polyethylene having a melt viscosity at 190° C. of 3075 cp., a saponification number of 4.0 and a Tm of 102° C.; 27.5% low density polyethylene having a melt index of 220, a melt viscosity at 190° C. of 41,000 cp, and a Tm of 100° C.; 16.5% hydrocarbon resin tackifier having a Ring and Ball Softening Point of 130° C.; 11% of an ethylene/ethyl acrylate copolymer having a melt index at 190° C. of 175 and an ethyl acrylate content of 28%; and 0.35% of Cyanox 1212 and 0.10% of Irganox 1010 antioxidants. The adhesive has a melt viscosity at 190° C. of 5500 cp. Books bound on the Minabinda with this composition give page pull values of 4.8 pounds/inch, page flex values of >300, and good flexibility at temperatures below 20° F. without failure of the binding. This example illustrates the utility of using ethylene/ethyl acrylate copolymers in place of ethylene/vinyl acetate copolymer in the practice of this invention.

EXAMPLE 3

A typical commercially available ethylene-vinyl acetate-based bookbinding hot-melt adhesive which contains 40% EVA copolymer, 40% tackifier, and 20% hydrocarbon wax is used to bind books on the Sulby Minabinda at a melt temperature of 350° F. This adhesive has a melt viscosity of 3000 cp at 190° C. Dummy books bound with this adhesive on the Sulby Minabinda give page pull values of 4.0 pounds/inch and page flex values of >300. However, after conditioning for 8 hours at 20° F., the binding of these books splits when the books are opened on a flat surface. This example shows that the ethylene/vinyl acetate copolymer-based adhesive is brittle at 20° F. It is evident by a comparison of this example with the results shown in Examples 1 and 2 that the hot-melt adhesives of this invention provide a substantial commercial advantage over known prior art bookbinding adhesives.

EXAMPLE 4

The procedure of Example 1 is followed to prepare a blend comprised of 55% polyethylene having a melt viscosity at 190° C. of 3075 cp., a saponification number of 4.0 and a Tm of 102° C.; 20% hydrocarbon resin tackifier having a Ring and Ball Softening Point of 130° C.; and 25% Elvax 220 ethylene/vinyl acetate copolymer plus 0.35% Cyanox 1212 and 0.10% Irganox 1010 antioxidants. The blend has a melt viscosity of 3200 cp at 190° C. The page pull of books bound with this adhesive as described in Example 1 is 4.5 pounds/inch and page flex is greater than 300. The books are flexible and nonbrittle at 20° F. This example shows that this adhesive provides strong bonds with good low temperature properties even with a blend melt viscosity of 3200 cp.

EXAMPLE 5

The procedure of Example 1 is followed except that the books to be bound are first primed with a poly(vinyl acetate)-based emulsion and dried (about 3-mil layer) before the hot-melt adhesive (about 18-mil layer) is applied to the book. The primed and adhesively bonded books provide page pull values of 5.3 pounds/inch and page flex values of greater than 300. The polyethylene-based hot-melt adhesive forms a strong bond to the primer and does not separate from the primer when the books are opened.

EXAMPLE 6

The procedure of Example 5 is followed except that the adhesive described in Example 4 is used. The primed and adhesively bound books provide page pull values of 4.9 pounds/inch and page flex values of greater than 300. This adhesive provides a strong bond to the primer.

EXAMPLE 7

The procedure of Example 1 is followed to bind books with an adhesive composition comprised of 50% polyethylene having a melt viscosity at 190° C. of 3075 cp., a saponification number of 4.0 and a Tm of 102° C.; 30% hydrocarbon resin tackifier having a Ring and Ball Softening Point of 130° C.; and 20% Elvax 220 ethylene vinyl acetate copolymer plus 0.35% Cyanox 1212 and 0.10% Irganox 1010 antioxidants. This composition has a melt viscosity of 11,800 cp at 190° C. When this adhesive is applied to the back of books at a melt temperature of 350° F., the adhesive climbed up the side of the wheel applicator. The page pull value of books bound with this adhesive is 2.8 pounds/inch and the page flex value is greater than 300. This example shows that an adhesive with melt viscosity greater than 10,000 cp cannot be properly applied from a wheel applicator.

EXAMPLE 8

The procedure of Example 1 is followed except that the ethylene/vinyl acetate copolymer (Elvax 420) used contains 18% vinyl acetate and it has a melt index of 138 at 190° C. The melt viscosity of this composition is 6100 cp at 190° C. and a 24-mil film of the adhesive is flexible and nonbrittle when flexed manually at 20° F. Books bound with this adhesive have page pull values of 4 pounds/inch and page flex values of greater than 300. This example shows that a polyethylene-based adhesive containing 11% of an ethylene-vinyl acetate copolymer with 18% vinyl acetate is a useful bookbinding adhesive.

EXAMPLE 9

The procedure of Example 1 is followed to prepare a composition containing 31.5% polyethylene having a melt viscosity at 190° C. of 3075 cp., a saponification number of 4.0 and a Tm of 102° C.; 27.5% polyethylene having a melt index of 220, a melt viscosity at 190° C. of 41,000 cp, and a Tm of 100° C.; 11% Elvax 220 ethylene/vinyl acetate copolymer; 30.0% hydrocarbon resin tackifier having a Ring and Ball Softening Point of 130° C.; and 0.35% Cyanox 1212 and 0.10% Irganox 1010 antioxidants. The melt viscosity of this blend is 5500 cp at 190° C. This composition provides a suitable melt viscosity for use in a wheel applicator, good page pull and page flex values, and good low-temperature flexibility at 20° F.

EXAMPLE 10

The procedure of Example 1 is followed to prepare a composition containing 26.5% polyethylene having a melt viscosity at 190° C. of 3075 cp., a saponification number of 4.0 and a Tm of 102° C.; 22.5% polyethylene having a melt index of 220, a melt viscosity at 190° C. of 41,000 cp, and a Tm of 100° C.; 11% Elvax 220 ethylene/vinyl acetate copolymer; 40.0% hydrocarbon resin tackifier having a Ring and Ball Softening Point of 130° C.; and 0.35% Cyanox 1212 and 0.10% Irganox 1010. The melt viscosity of this blend is 4800 cp at 190° C. Books bound with this adhesive are brittle when flexed at 20° F.

EXAMPLE 11

The procedure of Example 1 is followed to prepare a composition containing 88.55% polyethylene having a melt viscosity at 190° C. of 3075 cp., a saponification number of 4.0 and a Tm of 102° C.; 11% Elvax 220 ethylene/vinyl acetate copolymer; and 0.35% Cyanox 1212 and 0.10% Irganox 1010, eliminating the tackifier completely from the composition. This adhesive has a melt viscosity of 5500 cp at 190° C. and good flexibility at 20° F., but provides poor adhesion as shown by a page pull value of 1.9 pounds/inch and a page flex value of 69.

Although the invention has been described in considerable detail with particular reference to certain preferred embodiments thereof, variations and modifications can be effected within the spirit and scope of the invention.

We claim:

1. An adhesive composition having a melt viscosity below 10,000 cp. at 190° C. capable of being used as a hot-melt adhesive essentially consisting of a blend of
   (1) 85 to 45 weight percent polyethylene having a melting point of 95° to 115° C., a melt viscosity at 190° C. of about 100 to about 30,000 cp. and a density of about 0.904 g/cm$^3$ to about 0.940 g/cm$^3$, and an acid number of 0 to 60,
   (2) 10 to 35 weight percent of at least one tackifying resin selected from the group consisting of hydrocarbon resins, polyterpene resins, and rosin esters, and
   (3) 5 to 20 weight percent of an ethylene copolymer containing 10 to 35 weight percent vinyl acetate or alkyl acrylate and having a melt index of 50 to about 250.

2. An adhesive composition according to claim 1 wherein said polyethylene has a density of about 0.904 g/cm$^3$ to about 0.930 g/cm$^3$.

3. An adhesive composition according to claim 2 wherein said tackifying resin is hydrocarbon resin having a softening point of at least 100° C.

4. An adhesive composition according to claim 3 wherein said tackifying resin is a polyterpene resin having a softening point of at least 100° C.

5. An adhesive composition having a melt viscosity below 10,000 cp. at 190° C. capable of being used as a hot-melt adhesive essentially consisting of a blend of
   (1) 75 to 55 weight percent polyethylene having a melt viscosity of about 100 to about 30,000 cp at 190° C. and a density of about 0.904 g/cm$^3$ to about 0.940 g/cm$^3$,
   (2) 15 to 30 weight percent of at least one tackifying resin selected from the group consisting of hydrocarbon resins, polyterpene resins, and rosin esters, and
   (3) 10 to 15 weight percent ethylene/vinyl acetate copolymer or ethylene/alkyl acrylate copolymer having an ethylene content of 90 to 65 percent by weight and a melt index of 50 to about 250.

6. An adhesive composition according to claim 5 wherein said polyethylene has a density of about 0.904 g/cm$^3$ to about 0.930 g/cm$^3$.

7. An adhesive composition according to claim 6 wherein said tackifying resin is hydrocarbon resin having a softening point of at least 100° C.

8. An adhesive composition according to claim 7 wherein said tackifying resin is a polyterpene resin having a softening point of at least 100° C.

9. An adhesive composition having a melt viscosity below 10,000 cp. at 190° C. capable of being used as a hot-melt adhesive essentially consisting of a blend of
   (1) 75 to 55 weight percent polyethylene having a melt viscosity of about 100 to about 30,000 cp at 190° C. and a density of about 0.904 g/cm$^3$ to about 0.940 g/cm$^3$,
   (2) 15 to 30 weight percent of at least one tackifying resin selected from the group consisting of hydrocarbon resins, polyterpene resins, and rosin esters, and
   (3) 10 to 15 weight percent ethylene/vinyl acetate copolymer having an ethylene content of 90 to 65 percent by weight and a melt index of 50 to about 250.

10. An adhesive composition according to claim 9 wherein said polyethylene has a density of about 0.904 g/cm$^3$ to about 0.930 g/cm$^3$.

11. An adhesive composition according to claim 10 wherein said tackifying resin is hydrocarbon resin having a softening point of at least 100° C.

12. An adhesive composition according to claim 11 wherein said tackifying resin is a polyterpene resin having a softening point of at least 100° C.

13. An adhesive composition having a melt viscosity below 10,000 cp. at 190° C. capable of being used as a hot-melt adhesive essentially consisting of a blend of
    (1) 75 to 55 weight percent polyethylene having a melt viscosity of about 100 to about 30,000 cp at 190° C. and a density of about 0.904 g/cm$^3$ to about 0.940 g/cm$^3$,
    (2) 15 to 30 weight percent of at least one tackifying resin selected from the group consisting of hydrocarbon resins, polyterpene resins, and rosin esters, and
    (3) 10 to 15 weight percent ethylene/alkyl acrylate copolymer having an ethylene content of 90 to 65 percent by weight and a melt index of 50 to about 250.

14. An adhesive composition according to claim 13 wherein said polyethylene has a density of about 0.904 g/cm$^3$ to about 0.930 g/cm$^3$.

15. An adhesive composition according to claim 14 wherein said tackifying resin is hydrocarbon resin having a softening point of at least 100° C.

16. An adhesive composition according to claim 15 wherein said tackifying resin is a polyterpene resin having a softening point of at least 100° C.

17. An adhesive composition having a melt viscosity below 10,000 cp. at 190° C. capable of being used as a hot-melt adhesive essentially consisting of a blend of
    (1) 76 to 68 weight percent polyethylene having a melt viscosity of about 100 to about 30,000 cp at 190° C. and a density of about 0.904 g/cm$^3$ to about 0.940 g/cm$^3$,
    (2) 15 to 20 weight percent of at least one tackifying resin selected from the group consisting of hydrocarbon resins, polyterpene resins, and rosin esters,
    (3) 9 to 12 weight percent ethylene/vinyl acetate copolymer having an ethylene content of 90 to 65 percent by weight and a melt index of 50 to about 250, and
    (4) the stabilizer system comprising about 0.35 weight percent Cyanox 1212 and about 0.10 weight percent Irganox 1010.

18. An adhesive composition according to claim 17 wherein said polyethylene has a density of about 0.904 g/cm$^3$ to about 0.930 g/cm$^3$.

19. An adhesive composition according to claim 18 wherein said tackifying resin is hydrocarbon resin having a softening point of at least 100° C.

20. An adhesive composition according to claim 19 wherein said tackifying resin is a polyterpene resin having a softening point of at least 100° C.

* * * * *